United States Patent
Schwarz

(10) Patent No.: US 11,551,679 B2
(45) Date of Patent: Jan. 10, 2023

(54) MULTIMODAL DIALOG IN A MOTOR VEHICLE

(71) Applicant: Bayerische Motoren Werke Aktiengesellschaft, Munich (DE)

(72) Inventor: Felix Schwarz, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 113 days.

(21) Appl. No.: 16/383,170

(22) Filed: Apr. 12, 2019

(65) Prior Publication Data

US 2019/0237079 A1    Aug. 1, 2019

Related U.S. Application Data

(63) Continuation of application No. PCT/EP2017/074174, filed on Sep. 25, 2017.

(30) Foreign Application Priority Data

Oct. 13, 2016   (DE) ..................... 10 2016 220 004.6
Nov. 3, 2016    (DE) ..................... 10 2016 221 564.7

(51) Int. Cl.
*G10L 15/22*    (2006.01)
*G06F 3/16*     (2006.01)
(Continued)

(52) U.S. Cl.
CPC .............. *G10L 15/22* (2013.01); *G06F 3/017* (2013.01); *G06F 3/167* (2013.01); *G06F 3/0304* (2013.01);
(Continued)

(58) Field of Classification Search
CPC ......... G10L 15/22; G10L 15/24; G10L 15/25; G06F 3/0428; G06F 3/0233; G01C 21/36; G01C 21/3608
See application file for complete search history.

(56) References Cited

U.S. PATENT DOCUMENTS 6,243,683 B1 *   6/2001   Peters ..................... G10L 15/24
                                                        434/4
6,804,396 B2 *  10/2004   Higaki ............... G06K 9/00335
                                                        382/181
(Continued)

FOREIGN PATENT DOCUMENTS

CN      101855521 A    10/2010
CN      103294190 A     9/2013
(Continued)

OTHER PUBLICATIONS

PCT/EP2017/074174, International Search Report dated Dec. 7, 2017 (Two (2) pages).
(Continued)

*Primary Examiner* — Daniel Abebe
(74) *Attorney, Agent, or Firm* — Crowell & Moring LLP

(57) ABSTRACT

A method for carrying out a multimodal dialog in a vehicle, in particular a motor vehicle, via which method the interaction between the vehicle and a vehicle user is improved with regard to the provision of a dialog that is as natural as possible. For this purpose, the following acts are performed: sensing an input of a vehicle user for activating a voice dialog and activating gesture recognition.

9 Claims, 1 Drawing Sheet

(51) Int. Cl.
*G06F 3/01* (2006.01)
*G06F 3/03* (2006.01)

(52) U.S. Cl.
CPC ............... *G06F 2203/0381* (2013.01); *G10L 2015/223* (2013.01)

(56) References Cited

U.S. PATENT DOCUMENTS

| | | | | |
|---|---|---|---|---|
| 7,437,488 | B2* | 10/2008 | Ito | G06F 3/017 |
| | | | | 710/72 |
| 8,744,645 | B1* | 6/2014 | Vaghefinazari | B60R 16/0231 |
| | | | | 701/1 |
| 2002/0181773 | A1* | 12/2002 | Higaki | G06V 40/20 |
| | | | | 715/863 |
| 2009/0076827 | A1* | 3/2009 | Bulitta | 704/275 |
| 2011/0022393 | A1* | 1/2011 | Waller | G06F 3/0447 |
| | | | | 704/E15.001 |
| 2013/0033643 | A1* | 2/2013 | Kim | G06F 3/04895 |
| | | | | 348/E5.097 |
| 2013/0204457 | A1 | 8/2013 | King et al. | |
| 2013/0211843 | A1 | 8/2013 | Clarkson | |
| 2014/0379341 | A1* | 12/2014 | Seo | G06F 1/163 |
| | | | | 704/246 |
| 2015/0336588 | A1* | 11/2015 | Ebner | G01C 21/3664 |
| | | | | 701/2 |
| 2016/0335052 | A1* | 11/2016 | Faaborg | G06F 3/167 |
| 2017/0197636 | A1* | 7/2017 | Beauvais | G06F 3/167 |

FOREIGN PATENT DOCUMENTS

| | | |
|---|---|---|
| CN | 104115099 A | 10/2014 |
| CN | 104603720 A | 5/2015 |
| CN | 105282331 A | 1/2016 |
| DE | 10 2006 009 291 A1 | 9/2007 |
| DE | 10 2008 051 756 A1 | 5/2009 |
| DE | 10 2013 201 746 A1 | 8/2013 |
| DE | 10 2012 013 503 A1 | 1/2014 |
| DE | 10 2014 012 158 A1 | 3/2015 |
| EP | 1 830 244 A2 | 9/2007 |
| WO | WO 2009/062677 A2 | 5/2009 |
| WO | WO 2014/070872 A2 | 5/2014 |

OTHER PUBLICATIONS

German Search Report issued in German counterpart application No. 10 2016 221 564.7 dated Sep. 6, 2017, with Statement of Relevancy (Fourteen (14) pages).

Chinese Office Action issued in Chinese application No. 201780062525.X dated Oct. 10, 2022, with English translation (Seventeen (17) pages).

* cited by examiner

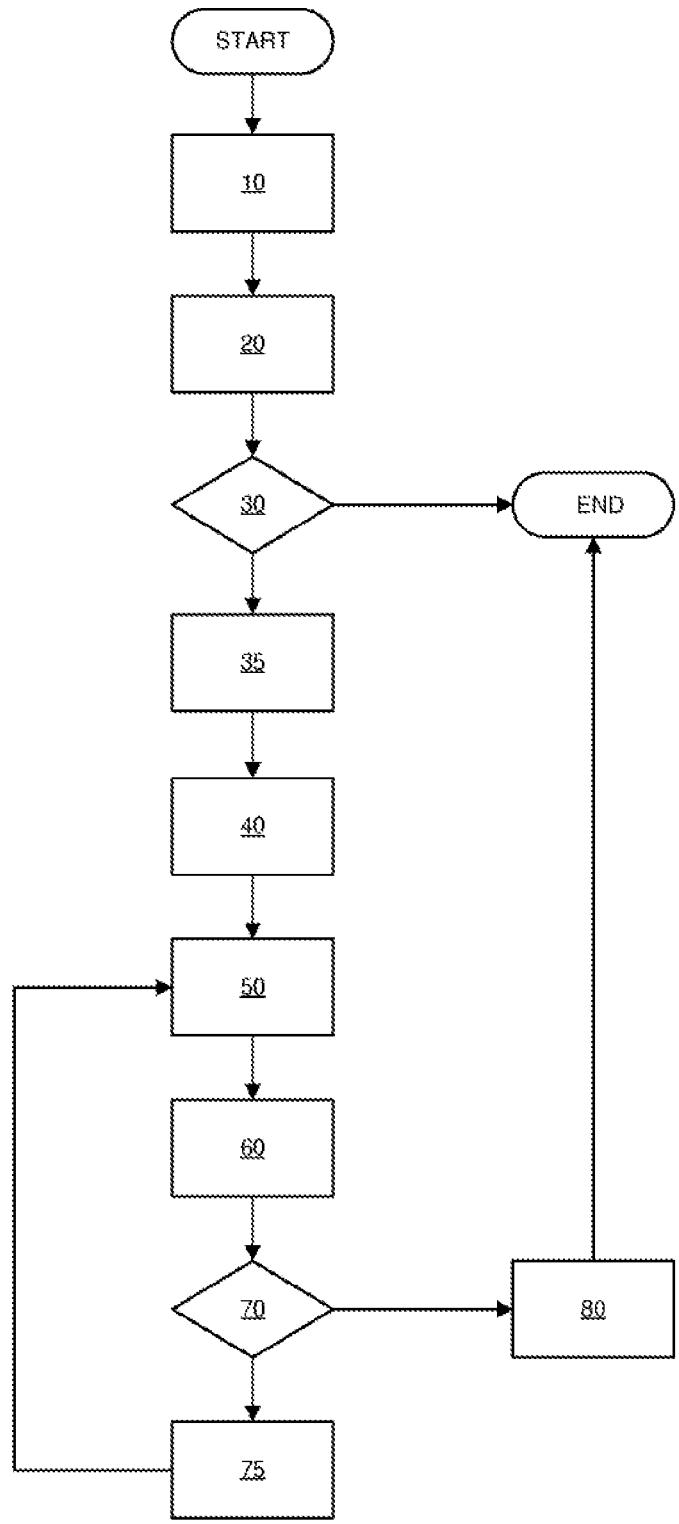

MULTIMODAL DIALOG IN A MOTOR VEHICLE

CROSS REFERENCE TO RELATED APPLICATIONS

This application is a continuation of PCT International Application No. PCT/EP2017/074174, filed Sep. 25, 2017, which claims priority under 35 U.S.C. § 119 from German Patent Applications Nos. 10 2016 220 004.6 and 10 2016 221 564.7, filed Oct. 13, 2016, and Nov. 3, 2016, respectively, the entire disclosures of which are herein expressly incorporated by reference.

BACKGROUND AND SUMMARY OF THE INVENTION

The present invention relates to a method for carrying out a multimodal dialog in a vehicle, in particular a motor vehicle, to a multimodal dialog machine for a vehicle, in particular for a motor vehicle, and to a motor vehicle.

A vehicle in the sense of the invention may be, in particular, an automobile or a truck. However, the invention can also be used in other land vehicles, watercraft, rail vehicles and aircraft.

Modern motor vehicles provide a multiplicity of different and partially complementary possible ways of operating functions of the vehicle. In addition to conventional operating elements, modern vehicles often have a voice input which makes it possible for a vehicle user, in particular a driver of the vehicle, to make particular inputs by voice. In this manner, telephone calls can be made, navigation destinations can be set or radio stations can be selected, for example.

Some vehicles are not only able to receive simple voice commands but rather are capable of a multipartite voice dialog. In response to the first voice input, the vehicle can therefore output responses or inquiries, to which the user can then in turn respond with a voice input. Alternatively, the user can also continue the dialog using conventional operating elements of the vehicle, that is to say can press a confirmation key, for example in order to confirm a result suggested by the vehicle by voice output (for example a telephone book entry or an address).

Gesture control, in which particular functions can be operated using particular hand gestures, is also known in motor vehicles. In order to avoid incorrect recognition, the gesture recognition in motor vehicles is generally not permanently fully available. Rather, particular gestures, in particular simple gestures, are enabled only after particular events have occurred. For example, a gesture for accepting a telephone call can be enabled only for a particular period after a telephone call has been received.

Natural human interaction is multimodal, that is to say comprises a plurality of different and possibly complementary communication channels, including, in particular, voice, gestures, facial expressions and others. Although, as described above, modern motor vehicles provide a plurality of natural communication channels for communicating with the vehicle, a multimodal dialog is known only in a very restricted form.

In this respect, DE 10 2012 013 503 A1 describes a method for operating a motor vehicle. In this case, combined gesture and voice control is provided. The vehicle occupant can point to objects such as points of interest (POI) with which he/she would like to interact, for example, and can give a voice command substantially at the same time, from which the form in which the vehicle occupant would like to interact with the object is clear.

There is a need to improve the interaction between the vehicle and the vehicle user with regard to the provision of a dialog which is as natural as possible.

In the method according to the invention for carrying out a multimodal dialog in a vehicle, in particular a motor vehicle, the following steps are provided;
 capturing an input of a vehicle user for activating a voice dialog, and
 activating gesture recognition.

The invention is based on the knowledge that, in known vehicles, gesture recognition is not possible precisely when a user started a dialog which is as natural as possible (namely a voice dialog) even though the multimodal continuation of the dialog with the means of voice and gestures corresponds to the natural interactive behavior of the person.

Therefore, the invention provides for the gesture recognition in the vehicle to be activated in response to the start of the dialog.

This makes it possible for a user to conduct a multimodal dialog with the vehicle, which dialog can comprise both voice inputs and gestures. At the same time, however, the known disadvantages of permanently activated gesture recognition are avoided.

The interaction possibility provided according to the invention also makes it possible to dispense with the need to continue a dialog with the vehicle with the aid of conventional operating elements (that is to say, for example, to confirm a suggested result by pressing on a pushbutton actuator of the vehicle). This also improves the interaction between the vehicle and the user with regard to its naturalness.

The input of the vehicle user for activating the voice dialog may be, for example, actuation of the so-called "push-to-talk" (PTT) button which is known in the prior art and may be arranged, for example, on a steering wheel of the motor vehicle.

Furthermore, provision may also be made for certain gestures, in particular certain complex gestures, to be permanently activated and therefore to be able to be permanently recognized. This can be useful because the risk of incorrect recognition is low in the case of complex gestures. In this case, the gesture recognition activated according to the invention is the recognition of such (preferably simple) gestures, the recognition of which is not permanently activated. In such an embodiment, the input of the vehicle user for activating the voice dialog may be a (complex) gesture.

Furthermore, provision may be made for the input of the vehicle user for activating the voice dialog to be or comprise a first voice input of the vehicle user. In other words, the voice dialog can therefore be initiated by means of a voice input from the vehicle user. An additional method step of processing the first voice input is provided in this embodiment.

One development of the invention provides for checking whether the dialog has been concluded. The step of activating the gesture recognition is carried out under the condition that the dialog has not been concluded. In this manner, voice inputs which can be immediately processed and do not initiate a further dialog do not initiate any activation of the gesture recognition.

In a further configuration, a further input is captured and processed. In other words, the vehicle is therefore enabled to receive further inputs of the user and therefore to continue the dialog. The further input may again be a voice input. However, it may be a gesture of the vehicle user, in particular. The vehicle user therefore begins the dialog with a first utterance which is a voice input. After his/her second utterance, the user can then use voice or gestures or another form of communication and can therefore conduct a multimodal dialog.

With further advantage, a check is carried out after each input in order to determine whether the dialog has been concluded. If this is true, the gesture recognition is deactivated. The dialog can be concluded, for example, by the user effecting a relevant input, that is to say aborting the dialog by actuating a particular operating element (sometimes referred to as the "push-to-talk" button in the prior art), by means of a corresponding voice command or by means of a corresponding gesture. Furthermore, the dialog can be concluded for content-related reasons, in particular if the command or the request from the user, which forms the content of his/her first voice input, has been conclusively carried out or answered.

The method may provide for an input request to be respectively output in response to the first voice input of the vehicle user and/or in response to the further input of the vehicle user. In other words, the vehicle therefore responds to inputs of the user and makes inquiries, in particular, or requests a further input from the user. The input request may be output, in particular, by voice output and/or by display on a screen of the vehicle (in particular on a head-up display, on a combination instrument and/or on a central screen arranged in the center console of the vehicle).

With particular advantage, provision may be made for the further input, in particular the gesture, of the vehicle user to be captured and/or processed on the basis of the input request. The gesture recognition accuracy, in particular, can be increased by taking into account certain properties of the input request (for example its type and/or content) when capturing and/or processing the further input. For this purpose, provision may be made, in particular, for only those gestures which are possible as a response to the previously output certain input request to be recognized as further inputs. This reduces the probability of incorrect recognition of a gesture.

One advantageous embodiment of the invention provides for the further input to be or comprise a gesture, wherein the input request is a request to select a suggested option, and wherein the gesture is a pointing gesture, preferably a pointing gesture carried out with a finger. Particularly preferably, the pointing gesture is a pointing gesture carried out in the direction of a screen, wherein the suggested option is displayed on the screen.

In other words, in this embodiment, it is intended to be possible to confirm a suggested option (for example a telephone book entry, an address for the navigation system, a music title, etc.) by means of a pointing gesture. This means, in particular, a gesture in which the vehicle user extends at least one finger, in particular an index finger. If the suggested option is displayed on a screen (for example a head-up display), provision may be made for the vehicle user to have to point the extended finger in the (at least approximate) direction of the screen. With further advantage, it may be additionally or alternatively required for the user to move his/her finger forward and/or forward and backward in the pointing direction. In other words, the user then carries out in the air a gesture imitating the actuation of a conventional pushbutton.

Another advantageous embodiment of the invention provides for the further input to be or comprise a gesture, wherein the input request is a request to select an option from a plurality of suggested options, wherein the input request is, in particular, a closed question or a request to select an entry in a results list, and wherein the gesture is a pointing gesture comprising a movement carried out in a substantially vertical manner, preferably a pointing gesture carried out with a finger, particularly preferably a pointing gesture carried out in the direction of a screen, wherein at least one of the suggested options is displayed on the screen.

In other words, in this embodiment, it is intended to be possible to "scroll" through a results list by means of a gesture in which the user moves an individual finger, in particular his/her index finger, up or down, in particular. Provision may be made for the previous or subsequent list entry (or vice versa) to be displayed with each upward or downward movement. However, provision may also be made for the display of the results list to be moved in the corresponding direction during an upward or downward movement depending on the speed and the amplitude of the gesture, with the result that it is advantageously possible to quickly navigate through results lists having a multiplicity of entries.

Another advantageous embodiment of the invention provides for the further input to be or comprise a gesture, wherein the gesture is a gesture comprising a movement carried out in a substantially horizontal manner with a hand or a finger. If this gesture, which can be referred to as a "swiping gesture", is recognized, the gesture recognition is deactivated. In other words, provision is therefore made for a further input formed by such a swiping gesture to be a command to abort the dialog. As a result, the abort function of the "push-to-talk" button can be replaced with a corresponding gesture with particular advantage.

However, it is expressly pointed out that the invention in no way excludes the function of such a button. It is even advantageous to provide the user with as many parallel interaction possibilities as possible. Provision can therefore be definitely made for the user to be able to both carry out a swiping gesture and effect a voice input ("conclude dialog") and actuate a conventional operating element ("push-to-talk" button) for the purpose of concluding a dialog.

The invention is also formed by a multimodal dialog machine for a vehicle, in particular for a motor vehicle, which is configured to carry out the method steps described above. The invention also comprises a motor vehicle having such a multimodal dialog machine.

A multimodal dialog machine according to the invention can be formed, in particular, by a control device of the vehicle which is set up to capture and process sensor signals and to control output devices. The sensors may be part of the multimodal dialog machine or may be connectable to the latter, wherein such a connection can be provided, for example, by means of a data bus system of the vehicle. The sensors may comprise a microphone for capturing voice inputs and a camera for capturing gestures of the vehicle user. The output devices may comprise a loudspeaker and/or a screen for outputting input requests.

Further embodiments of the invention are explained below on the basis of an exemplary illustration.

Other objects, advantages and novel features of the present invention will become apparent from the following detailed description of one or more preferred embodiments when considered in conjunction with the accompanying drawing.

BRIEF DESCRIPTION OF THE DRAWING

The FIGURE shows a flowchart of an embodiment of the method according to the invention.

DETAILED DESCRIPTION OF THE DRAWING

It is pointed out that the FIGURE and the associated description are merely an exemplary embodiment of the invention. In particular, the illustration of combinations of features in the FIGURE and/or in the description of the FIGURE should not be interpreted to the effect that the invention necessarily requires the implementation of all features mentioned. Other embodiments of the invention may contain fewer, more and/or different features. The scope of protection and the disclosure of the invention emerge from the accompanying patent claims and the complete description.

At the start of the method, a first voice input of a vehicle user is captured in step 10. At this time, the gesture recognition is not yet active. The voice input could be, for example, "Call Robert Meyer".

The first voice input is then processed in step 20, for which purpose a telephone book stored in the vehicle or in a mobile telephone connected to the vehicle is searched, for example.

Step 30 checks whether the dialog has been concluded. If this is the case, the method ended. This could be the case, for example, if the first voice input were so clear that it could be immediately carried out. In the present example, however, it shall be assumed that a plurality of telephone numbers are stored for the telephone book entry of "Robert Meyer".

An input request is therefore output in step 35. In this respect, a list of all telephone numbers for Robert Meyer is output on a head-up display and the telephone number stored as the main number is graphically highlighted. At the same time, the input request comprises a voice output of the content "Would you like to call Robert Meyer's main number?".

The gesture recognition is now activated in step 40. From this time, the vehicle user can conduct the dialog in a multimodal manner. This also means that he/she can but need not necessarily use gestures. He/she could also continue the dialog with further inputs which are voice inputs or could use conventional operating elements.

In step 50, a further input of the vehicle user which is a gesture is captured. The vehicle user could now abort the dialog with a swiping gesture or could scroll through the list of telephone numbers displayed on the head-up display using a "scrolling gesture" (pointing gesture in the upward or downward direction). However, it shall be assumed that the user would like to select the suggested option (Robert Meyer's main number). The further input of the vehicle user therefore comprises a pointing gesture in which the vehicle user holds his/her extended index finger in the direction of the head-up display (and therefore in the direction of the windshield of the vehicle) and moves it slightly forward and then back again in this direction (that is to say in the pointing direction).

During the processing of the further input which is carried out in step 60, this gesture is interpreted and carried out. The telephone call is made.

Step 70 checks whether the dialog has been concluded. This is the case in the present case, with the result that the gesture recognition is deactivated in step 80 and the method ends. If, in contrast, it were necessary to continue the dialog (for example because the further input was misleading or ambiguous), an input request could be output in step 75 ("I did not understand you. Please repeat your input."). The method would then be continued with step 50 in which a further input is captured.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for carrying out a multimodal dialog in a vehicle, comprising the acts of:
    permanently activating a complex gesture recognition in the vehicle such that complex gestures are able to be permanently recognized;
    capturing a first input of a vehicle user for activating a voice dialog;
    activating the voice dialog in response to the capturing wherein a simple gesture recognition is not yet activated such that simple gestures are not yet able to be recognized;
    before activating the simple gesture recognition, checking whether the voice dialog has been concluded; and
    activating the simple gesture recognition such that simple gestures are able to be recognized when the checking determines that the voice dialog has not been concluded.

2. The method as claimed in claim 1, wherein the first input of the vehicle user for activating the voice dialog is a first voice complex gesture of the vehicle user.

3. The method as claimed in claim 1 further comprising the acts of:
    capturing a second input of the vehicle user; and
    processing the second input.

4. The method as claimed in claim 1 further comprising the acts of:
    checking whether the voice dialog has been concluded after activating the simple gesture recognition; and
    deactivating the simple gesture recognition when the checking determines that the voice dialog has been concluded.

5. The method as claimed in claim 3 further comprising the acts of:
    outputting an input request in response to the first input of the vehicle user; and/or
    outputting the input request in response to the second input of the vehicle user.

6. The method as claimed in claim 5, wherein the input request is a spoken input request.

7. The method as claimed in claim 5 further comprising the act of capturing and/or processing the second input of the vehicle user on a basis of the input request.

8. A multimodal dialog machine for a vehicle for carrying out the method as claimed in claim 1.

9. A motor vehicle comprising the multimodal dialog machine as claimed in claim 8.

* * * * *